July 26, 1949. H. C. JONES, JR 2,477,131
JUNCTION BOX
Filed Dec. 22, 1945
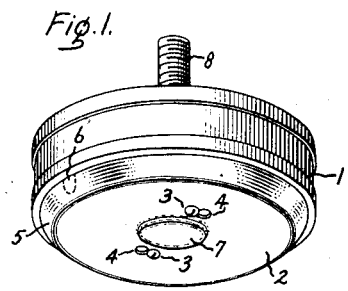
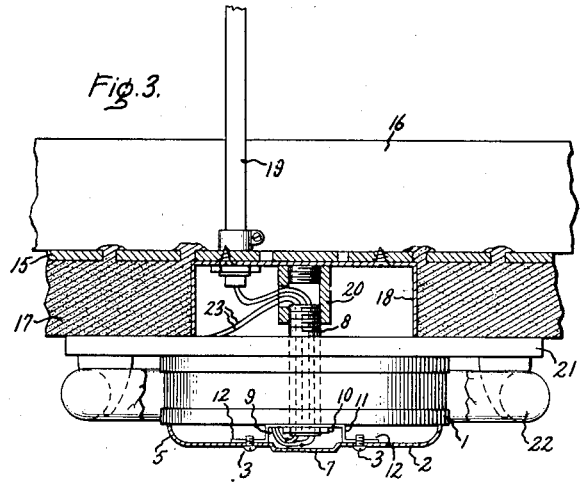
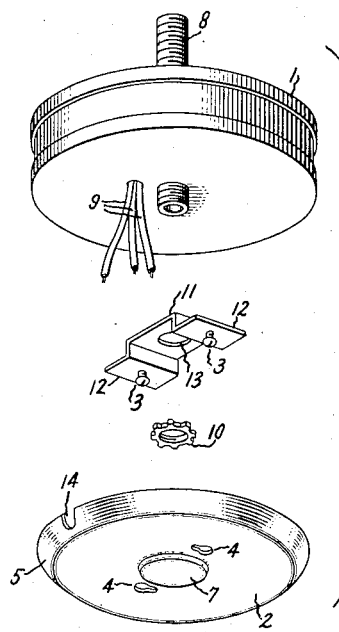
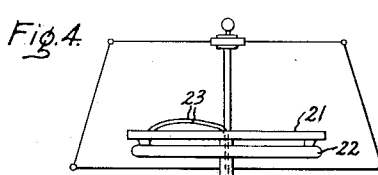
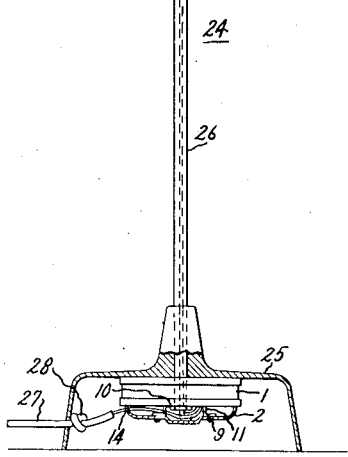
Inventor:
Henry C. Jones Jr.,
by Ernest C. Britton
His Attorney.

Patented July 26, 1949

2,477,131

UNITED STATES PATENT OFFICE 2,477,131

JUNCTION BOX

Henry C. Jones, Jr., Fort Wayne, Ind., assignor to General Electric Company, a corporation of New York Application December 22, 1945, Serial No. 636,663

2 Claims. (Cl. 173—338)

This invention relates to junction boxes for electric wiring and more particularly to a new and improved junction box for discharge lamp ballasts.

It is well known that wiring devices are highly standardized in certain respects so as to reduce costs, comply with underwriter's requirements, promote ease of installation and give maximum interchangeability and adaptability. The lighting industry is preparing for an expected tremendous demand for fluorescent lamps and therefore much thought and effort is being spent on producing auxiliaries for such lamps which are simple, inexpensive, as nearly universally adaptable to all applications as possible, attractive in appearance, and strong. Such lamps require a ballast and it is desirable to house this ballast in a container which is as nearly universally adaptable as possible to all the various applications and locations of fluorescent lamps. Thus, it should be readily adaptable for concealed or exposed mounting in portable lamps of the floor and table variety and in both wall and ceiling fixtures for lamps. Because it should be capable of exposed mounting, its appearance is of course also a factor to be considered. A ballast container which has been adopted as most nearly meeting all these requirements has generally the shape of a pill box, although in a much larger range of sizes. This also makes it adaptable for use with a circular fluorescent lamp or tube which in some cases may surround the ballast. The circular ballast container has an axial mounting hole through which a standard three-eighths inch pipe nipple, such as is commonly used in wiring devices and fixtures, can be passed. Such a pipe fitting is clamped to the box by a nut and it serves both as a mechanical support and wire conduit. Connections to the ballast are made by wires which pass through a hole in one of the flat sides of its container. These wires are connected to both the supply line and the lamp and it is necessary that all the connections be covered or enclosed in a junction box or its equivalent. The features of this ballast form the subject matter of an application S. N. 637,027 filed December 22, 1945 in the name of Robert F. Rowe and assigned to the present assignee.

The problem involved in providing a junction box for a circular ballast is of course not the simple one of merely providing a housing for its electrical connections. An ordinary house wiring junction box could be used to do this. Nor is there any problem in merely attaching such a box to the ballast. The real problem is how to do those things the simplest, cheapest, safest, most nearly universally adaptable and attractively appearing way.

In accordance with this invention one side of the ballast container also is a wall of the junction box. The new part which in combination with the ballast forms the junction box is a simple one-piece sheet metal stamping which can be made in a single operation. It is of circular dished shape which when in place rounds off and enhances the appearance of the ballast. The only other part, not counting a pair of standard machine screws, is a bracket which can be stamped from metal strip material in one operation.

An object of the invention is to provide a new and improved electric junction box.

A further object of the invention is to provide a simple, inexpensive, attractive, strong junction box for a circular ballast for electric discharge devices.

The invention will be better understood from the following description taken in connection with the accompanying drawing and its scope will be pointed out in the appended claims.

In the drawing Fig. 1 is a perspective view of the invention applied to a circular ballast; Fig. 2 is an exploded view showing how the parts are assembled; Fig. 3 is a sectional view of a ceiling-mounted circular fluorescent lamp fixture which includes the invention, and Fig. 4 illustrates an application of the invention to a portable floor lamp.

Referring now to the drawing and more particularly to Fig. 1, the pill box shaped ballast is indicated at 1 and attached to the lower flat side thereof, as viewed in the drawing, is a junction box forming cover member 2. This is held in place by a pair of screws 3, such as machine screws or self-threading sheet metal screws, which cooperate with keyhole slots 4 in the member 2. The member 2 which is generally flat has its periphery formed into a rounded flange 5 whose edge rests snugly against the flat side of the ballast 1. This serves to break the sharp edged appearance of the ballast and produces a rounded and more attractively finished article. The rounded flange 5 is provided with a knockout 6 for forming a slot through which a lead-in wire can be passed.

At the center of the member 2 and between the key-hole slots 4 is a circular extruded portion 7 whose outer surface is substantially flush with the heads of the screws 3. The purpose of this extruded portion is to provide more space for the wire connections, as will be described more clearly below.

Referring now to Fig. 2, the ballast 1 is shown as being provided with an axial mounting hole through which extends a standard wiring device pipe nipple 8 which in practically all cases is a three-eighths inch size pipe. Such a pipe can be screwed into the central stud on standard house wiring outlet or junction boxes and it can also be screwed into various other wiring device fixtures and lamp fittings or adapters. Extending out through one of the flat sides of the ballast 1 are a plurality of wires 9.

The ballast is mounted in position by means of a nut 10 which is threaded onto the pipe 8 and serves to clamp the ballast 1 securely in place. In order to hold the cover member 2 in place against the flat side of the ballast 1 a bracket 11 is provided. This bracket is generally U-shaped and has outwardly extending feet 12, into which are screwed the screws 3 and it has a mounting hole 13 in its yoke portion. The hole 13 corresponds in size to the axial hole through the ballast 1 and the bracket 11 is held in place by clamping it between the side of the ballast 1 and the nut 10. This has numerous advantages. Thus, in cases where the ballast 1 is mounted in an enclosed location, such as in the base of a floor lamp which has a bottom plate, the cover 2 will not be necessary and in such cases the bracket 11 can easily be omitted without in any way marring or changing the ballast. If the cover 2 were fastened directly to the ballast by screws which pass through the side of the ballast there would be danger that the screws would contact and injure the electrical parts inside the ballast and, furthermore, as the ballast is filled with compound, there would be danger of this compound leaking out through these holes. If the cover 2 were held in place by welded brackets, then those brackets would not be used in many cases where it was unnecessary to use the junction box cover 2. Also, if such brackets were spring clip type brackets so that the cover 2 could be snapped on and off, there would be danger that an accidental pull on the incoming line cord would force the cover 2 off and thus expose the wiring connections. Therefore, the present invention provides a very simple construction in which the entire junction box cover assembly is held in place by the same mounting means for the ballast and no additional parts are necessary.

The bracket 11 can be formed in a single stamping operation from metal strip material of the proper width. In case sheet metal type screws are used it will be unnecessary to tap the holes in the feet 12, but if ordinary machine screws are used these holes can easily be tapped, in which case it will be preferable to have the holes punched inwardly so as to form extruded walls for the threads. The height of the bracket is slightly less than the height of the flanged cover 2 so that when the cover is in place and the screws 3 are drawn up tight the bracket will be sprung outwardly slightly and will thus hold the cover tightly in place against the side of the ballast so that all looseness and possibility of vibration is eliminated. In Fig. 2 the knockout 6 has been removed so that a notch 14 is formed in the flange 5 for accommodating a wire lead.

Fig. 3 shows an application of the invention to a ceiling mounted circular fluorescent lamp. This shows the standard house construction in which lath or plaster board 15 is attached to the under side of floor stringers 16 and plaster 17 is in turn applied to the lath 15. Inserted in the plaster and attached to the lath is a standard house wiring outlet box 18. Coming into the box 18 is a supply cable, such as a standard "B-X" cable 19. Threaded onto the central stud of the box 18 is an adapter 20 to which is attached the nipple 8. Fitted over this nipple is a circular fluorescent lamp holder 21 which is surrounded by a circular fluorescent lamp 22. Placed inside the holder 21 and lamp 22 is the ballast 1 through which nipple 8 also passes. The bracket 11 is then placed over the end of the pipe 8 and the nut 10 put on and drawn up so as to clamp these parts in place. The wires 19 are passed through the nipple 8 and are connected to the wires 9 from the ballast and are also connected to another set of wires 23 which lead upwardly through the nipple 8 and to a socket (not shown) on the lamp holder 21 for the lamp 22. In an installation of this kind the slot 14 will not be necessary and, therefore, the knockout 6 will be left in place. The cover 2 is easily applied by means of its keyhole slots and after the heads of the screws 3 are passed through these slots and the cover is given a slight twist the screws are tightened and the cover is firmly held in place. It will be seen clearly in Fig. 3 that the central extruded portion 7 on the junction box cover 2 provides extra space in line with the nipple 8 for the wires going into the nipple. The minimum height under the cover 2 is enough to clear a standard wire nut or equivalent solderless connector and all the electrical connections can be made by such means.

In Fig. 4 the invention is applied to a floor lamp 24. This lamp is shown as having a base 25 into the top of which is threaded the upright pipe or support 26 for the lamp. At the top of the pipe 26 is a lamp holder 21 on which is mounted a circular fluorescent lamp 22.

The end of the pipe 26 which is threaded into the base 25 extends far enough to permit the ballast 1 and the bracket 11 to be slipped over it and then the nut 10 put in place so as to clamp these two members tightly against the under side of the base 25. In this case a line supply lead 27 extends through an opening near the bottom of the base and an underwriter's knot 28 may be made in this lead to provide a strain relief for the electrical connections. However, the knockout slot or notch 14 in the cover 2 is designed to accommodate a strain relief lead anchor of the moulded vulcanized rubber type now in common use so that the use of an underwriter's knot is optional. Connections are made between the wires 27 and the wires 9 of the ballast 1 and wires 23 which extend upwardly through the pipe to the lamp 22. After all the connections have been made the cover 2 is slipped into place over the screws 3 by means of the keyhole slots in the cover. It will be observed that it is unnecessary to thread the lead 27 through a hole in the cover 2 because this cover is provided with a knockout 6 for forming the slot 14, so after all the connections have been made it is merely necessary to be sure that the lead 27 fits into the slot 14.

It will of course be obvious that the invention is not limited to ballasts for electric discharge devices and that it can be used with other electrical devices having wires which extend through a side thereof and whose connections must be enclosed in a junction box or its equivalent.

While there has been shown and described a particular embodiment of this invention, it will be obvious to those skilled in the art that various changes and modifications can be made therein without departing from the invention and therefore it is aimed in the appended claims to cover all such changes and modifications as fall within the true spirit and scope of the invention.

What I claim as new and desire to secure by Letters Patent of the United States, is:

1. In combination, a flat-sided circular ballast for an electric discharge device, an axial bore through said ballast, a plurality of wires extending through an opening in one of the flat sides of said ballast, a generally U-shaped bracket with outwardly extending feet and a hole through its yoke, a threaded pipe extending through said bore and hole, a nut threaded on said pipe and clamping said bracket to said ballast, screws threaded into the feet of said bracket, a dished circular junction box cover whose external effective height is slightly less than the external height of said bracket, a pair of keyhole slots in said cover which receive the heads of said screws, an outwardly extruded center portion in said cover which extends beyond the surrounding outer surface of said cover a distance substantially equal to the height of the heads of said screws, and a notch in the periphery of said cover which accommodates a wire lead.

2. In combination, an enclosed electric device having a mounting hole extending entirely through it, a threaded conduit passing through said mounting hole, a bracket member having a pair of outwardly extending feet and a central hole fitted over said conduit, a nut threaded onto said conduit and serving the dual purpose of clamping said bracket between it and said device and clamping said device between said bracket and any suitable support, wires extending from said device adjacent said bracket, a dished cover member enclosing said wires and said bracket and said nut and forming with said device a junction box which encloses connections to said wires, and attaching means for said cover member comprising screws extending through it and into openings in the feet of said bracket.

HENRY C. JONES, Jr.

REFERENCES CITED

The following references are of record in the file of this patent:

UNITED STATES PATENTS

| Number | Name | Date |
| --- | --- | --- |
| 904,320 | Dustman | Nov. 17, 1908 |
| 1,135,699 | Knauber | Apr. 13, 1915 |
| 1,544,736 | Graham | July 7, 1925 |
| 1,901,232 | Glowacki | Mar. 14, 1933 |
| 2,427,965 | Henderson | Sept. 23, 1947 |

FOREIGN PATENTS

| Number | Country | Date |
| --- | --- | --- |
| 672,012 | France | Dec. 21, 1929 |